United States Patent
Al-Haj Ali et al.

(10) Patent No.: US 11,400,427 B2
(45) Date of Patent: Aug. 2, 2022

(54) PROCESS FOR PROVIDING A HOMOGENOUS SLURRY CONTAINING PARTICLES

(71) Applicant: Borealis AG, Vienna (AT)

(72) Inventors: Mohammad Al-Haj Ali, Porvoo (FI); Kauno Alastalo, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/271,629

(22) PCT Filed: Nov. 28, 2019

(86) PCT No.: PCT/EP2019/082862
§ 371 (c)(1),
(2) Date: Feb. 26, 2021

(87) PCT Pub. No.: WO2020/109446
PCT Pub. Date: Jun. 4, 2020

(65) Prior Publication Data
US 2021/0339215 A1    Nov. 4, 2021

(30) Foreign Application Priority Data
Nov. 29, 2018    (EP) ..................................... 18209106

(51) Int. Cl.
*B01J 8/10*    (2006.01)
*B01J 8/00*    (2006.01)
(Continued)

(52) U.S. Cl.
CPC ................. *B01J 8/10* (2013.01); *B01J 8/001* (2013.01); *B01J 8/085* (2013.01); *B01J 19/004* (2013.01);
(Continued)

(58) Field of Classification Search
CPC ................ B01J 8/085; B01J 2208/0061; B01J 2208/00769; B01J 2208/00867;
(Continued)

(56) References Cited

U.S. PATENT DOCUMENTS

2019/0225715 A1*    7/2019    Moman ............. B01F 15/00915

FOREIGN PATENT DOCUMENTS

WO    WO 2015/177014 A1    11/2015
WO    WO 2016/036722 A1    3/2016

OTHER PUBLICATIONS

Claire Jackson et al., "Hydrated lime handling systems for thermal enhanced oil recover: Toolkit Contents", Aug. 18, 2016 (Aug. 18, 2016), XP055589445, Retrieved from the Internet: URL:https://watersmartsolutions.ca/wp-content/uploads/2018/08/LimeHandlingToolkit_WebVersion.pdf, [retrieved on Aug. 18, 2016], p. 17—paragraph 4.4.4.

(Continued)

*Primary Examiner* — Lessanework Seifu
(74) *Attorney, Agent, or Firm* — Fay Sharpe LLP

(57) ABSTRACT

The present invention is concerned with a process for providing a homogeneous particle-containing slurry comprising the steps of: (a) providing a vessel comprising at least one impeller rotating around a vertical axis of the vessel, wherein a rotational speed $n_1$ of the at least one impeller is higher than $n_{min}$ according to equation (1), the vessel further comprising an inlet and an outlet; (b) introducing a particle-containing slurry into the vessel or introducing components forming the particle-containing slurry into the vessel; (c) rotating the at least one impeller at least around the vertical axis for homogenizing and/or maintaining a homogeneous particle distribution within the slurry; (d) withdrawing the homogeneous particle-containing slurry (Continued)

Control algorithm for automated operation.

via the outlet; (e) reducing the rotational speed $n_1$ of the at least one impeller to a reduced rotational speed $n_{red}$, whereas $n_{red}$ is lower than $n_1$ and higher or equal gas inlet than $n_{min}$ according to equation (1):

$$n_{min} = \frac{S v^{0.1} D_p^{0.2} \left(g \frac{\Delta \rho}{\rho_f}\right)^{0.45} B^{0.13}}{D_a^{0.85}}. \tag{1}$$

8 Claims, 3 Drawing Sheets

(51) Int. Cl.
B01J 8/08 (2006.01)
B01J 19/00 (2006.01)
B01J 19/06 (2006.01)

(52) U.S. Cl.
CPC ........... *B01J 19/0066* (2013.01); *B01J 19/06* (2013.01); *B01J 2208/0061* (2013.01); *B01J 2208/00769* (2013.01); *B01J 2208/00867* (2013.01); *B01J 2219/002* (2013.01); *B01J 2219/00182* (2013.01); *B01J 2219/00189* (2013.01)

(58) Field of Classification Search
CPC ...... B01J 19/004; B01J 19/0066; B01J 19/06; B01J 2219/00182; B01J 2219/00189; B01J 2219/002
See application file for complete search history.

(56) References Cited

OTHER PUBLICATIONS

Manoj Kandakure et al: "CFD Study of Slurry Homogenizer", Seventh International Conference on CFD in the Minerals and Process Industries CSIRO, Dec. 1, 2009 (Dec. 1, 2009), pp. 9-11, XP055589407, Retrieved from the Internet: URL:http://www.cfd.com.au/cfd_conf09/PDFs/152KAN.pdf [retrieved on Dec. 1, 2009], Thus during each batch, the liquid level needs to be maintained more than the impeller location.; p. 5.

Dilanji Bhagya Wijayasekara: "Minimum Agitation Speed for Solid Suspension and Mixing Time in a Torispherical-Bottomed Pharmaceutical Stirred Tank Under Different Baffling Conditions", May 31, 2010 (May 31, 2010), XP055589253, Retrieved from the Internet: URL:http://archives.njit.edu/vol01/etd/2010s/2010/njit-etd2010-073/njit-etd2010-073.pdf [retrieved on May 16, 2019] p. 14.

International Search Report dated Feb. 14, 2020 from PCT/EP2019/082862.

* cited by examiner

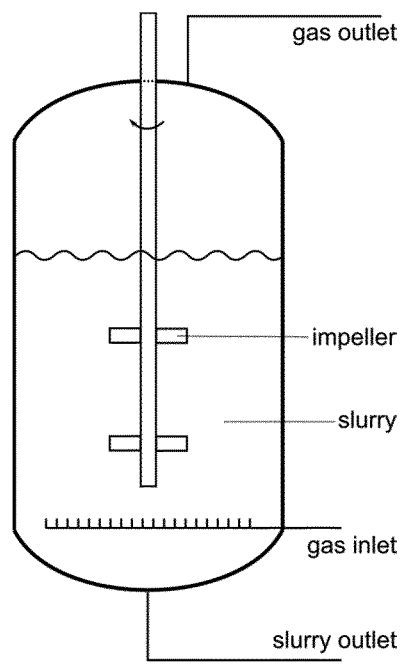
Figure 1: Exemplary vessel used in present invention.
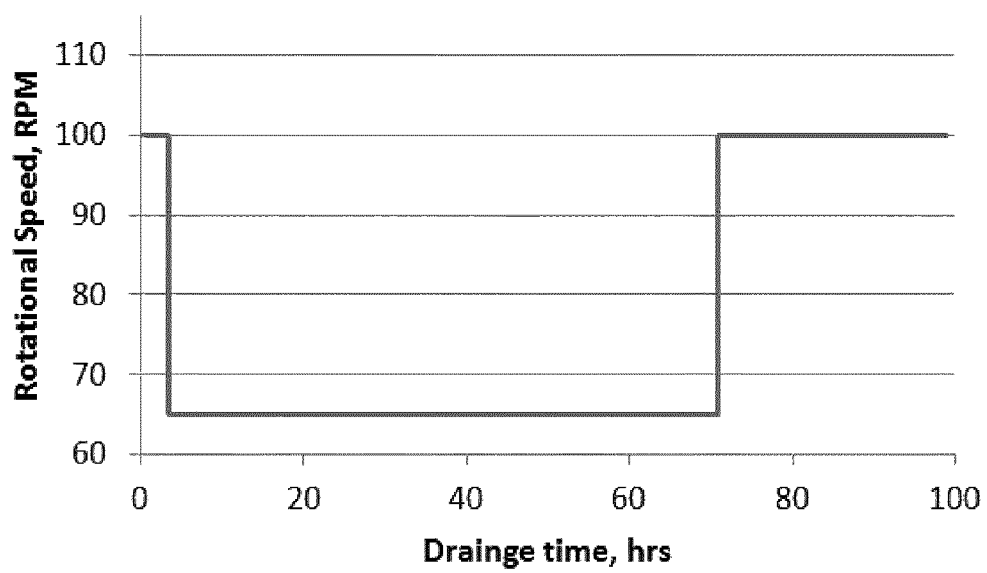
Figure 2: Implementing the minimum rotational speed.

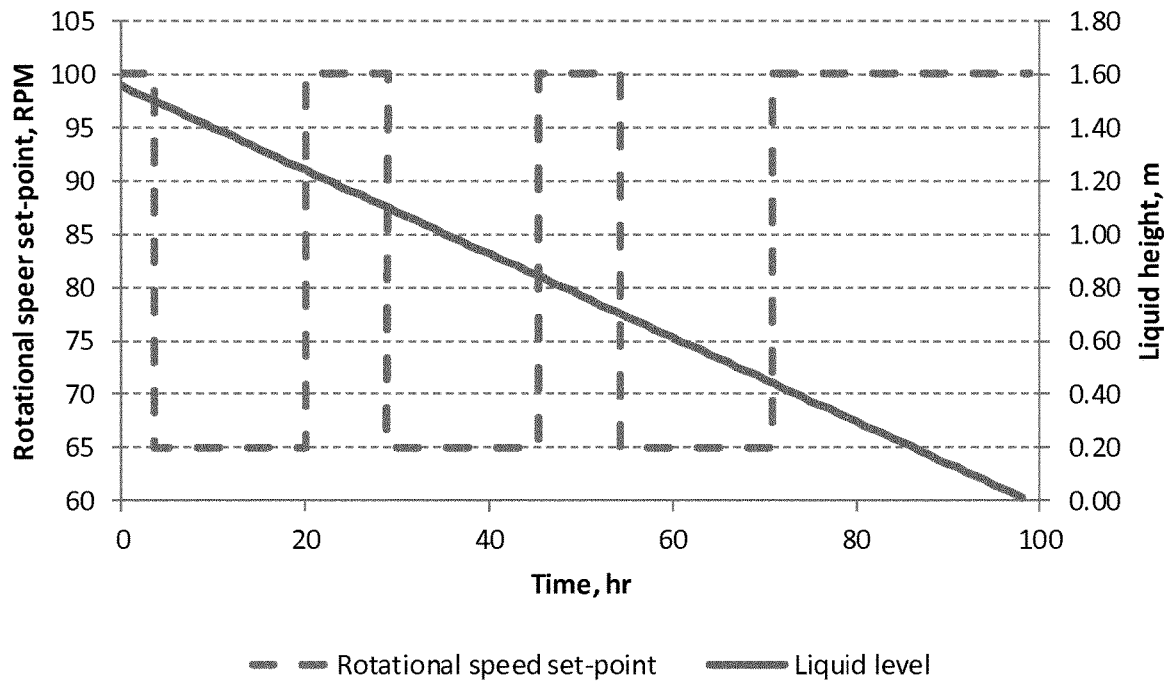
Figure 3: Implementing the minimum rotational speed in intervals around the impellers.
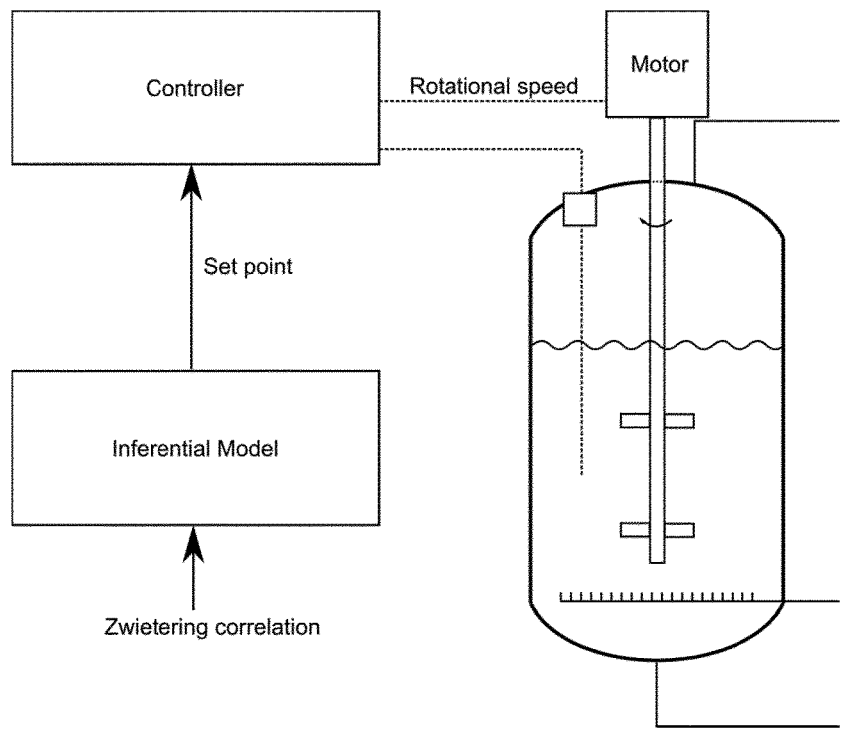
Figure 4: Control algorithm for automated operation.

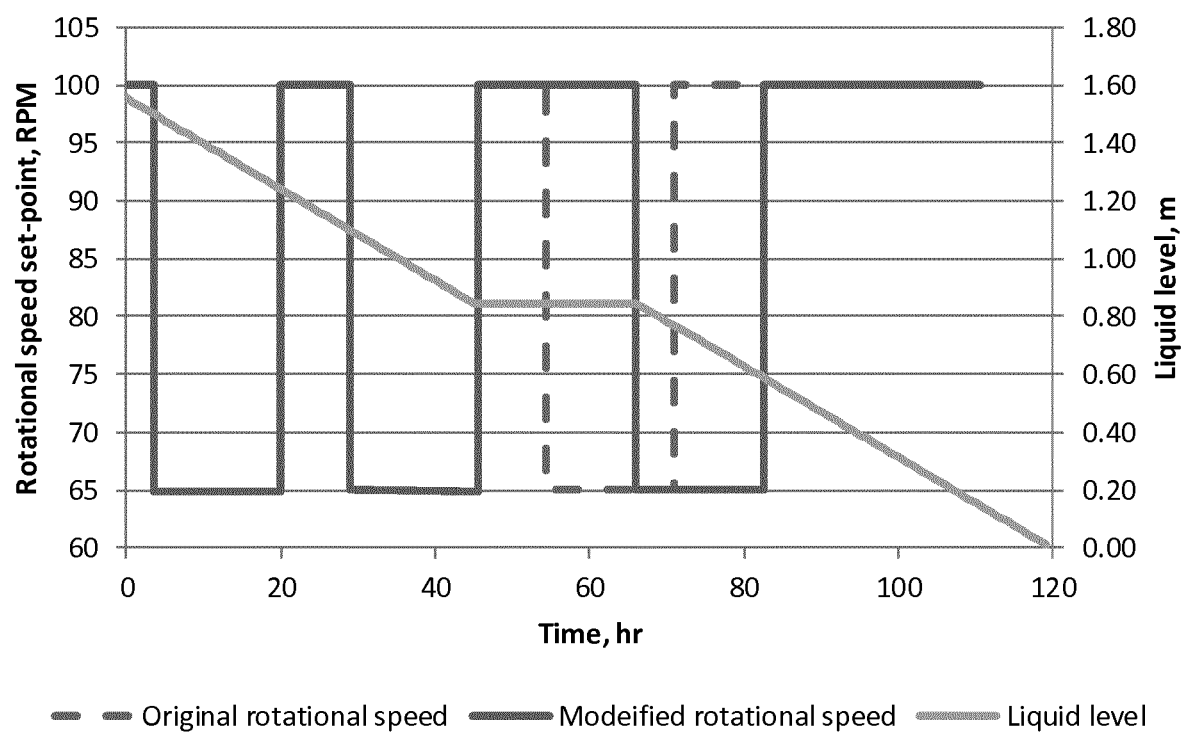
Figure 5: Function of the control algorithm.

PROCESS FOR PROVIDING A HOMOGENOUS SLURRY CONTAINING PARTICLES

The present invention relates to a process for providing a homogenous slurry containing particles in a stirred-tank vessel.

BACKGROUND

Slurry reactors are widely implemented in the production of polymers, in particular in the production of olefin based polymers. Preferable embodiments of such reactors are continuous stirred tank reactors (CSTR). Such reactors are equipped with a mixer provided by a rotatable vertical axis, to which one or more impellers are mounted. In these reactors, the impellers are kept rotating to prevent or minimize sedimentation of the particles in the slurry.

EP 1 133 350 A1 is concerned with problems of such reactors using separator plates causing the formation of plugs or blockages. The presence of blockages may cause the subsequent formation of lumps in the slurry or the formation of hot spots within the reactor vessel. Moreover, the presence of separator plates results in a much broader residence time distribution pattern. EP 1 133 350 A1 provides as a solution a reactor formed from a single non-partitioned reaction chamber lined longitudinally with baffles to aid mixing.

EP 0 446 059 A1 uses continuously stirred tank reactors to prepare a catalyst slurry, which is introduced into the reactor in the form of a prepolymer suspension prepared in a prepolymerization zone, to prevent the catalyst introduced into the reactor and the polymer formed from containing excessively fine particles which can be entrained by the gaseous stream and clog the recycle gas pipes.

However, such reactors still have drawbacks. For example, if the level of slurry is passing an impeller e.g. during withdrawal of the slurry from the vessel, splashing of slurry onto the walls of the vessel is caused. Consequently, catalyst mud/paste is accumulated on the wall of the vessel. This accumulated lump might fall down and block the outlet preferably located at the bottom of the vessel.

One possible solution to this problem is the usage of down- and/or up-pumping hydrofoil impellers for a down-pumping configuration such as described in the '*Handbook of Industrial Mixing: Science and Practice*', edited by: Paul, E., Atiemo-Obeng, V., Kresta, S. John Wiley and Sons, 2004. pp. 345-390 as well as in '*Unit Operations of Chemical Engineering*', McCabe, W., Smith, J., Harriott, P., and Mcgraw-Hill, 1993. Such impellers generally enhance the mixing inside the vessel and reduce the splashing of the slurry to vessel walls. Nevertheless, still splashing occurs when the slurry level is at the level of the impeller.

Object of the Present Invention

Hence, in view of the above-mentioned problem in the prior art, it is an object of the present invention to provide a process for providing a homogenous slurry containing particles having reduced splashing in a continuous stirred tank reactor in particular if the level of the slurry is close to the level of an impeller.

It now has been surprisingly discovered by the inventors that the splashing effect of slurry in continuous stirred-tank reactors can be significantly reduced in that the rotational speed of the impeller is reduced when the level of the slurry is close to the upper or lower level of the impeller.

However, significantly reducing the rotational speed of the impeller might lead to sedimentation of the particles of the slurry in the slurry phase. Sedimentation on the other hand should be prevented as it can block the outlet of the vessel, decrease the yield of the reactor or further block the stirring of the reactor leading to total failure of the system.

SUMMARY OF THE INVENTION

It has now been surprisingly found by the inventors that the splashing effect in continuous stirred-tank reactors can be significantly reduced and sedimentation of the particles in the slurry can be prevented at the same time, if the rotation speed of the impeller is reduced to a predetermined speed preventing sedimentation when the level of the slurry is close to the upper or lower level of the impeller.

Hence, the present invention provides a process for providing a homogeneous particle-containing slurry comprising the steps of:

(a) providing a vessel comprising at least one impeller rotating around a vertical axis of the vessel, wherein a rotational speed $n_1$ of the at least one impeller is higher than $n_{min}$ according to equation (1), the vessel further comprising an inlet and an outlet;

(b) introducing a particle-containing slurry into the vessel or introducing components forming the particle-containing slurry into the vessel;

(c) rotating the at least one impeller at least around the vertical axis for homogenizing and/or maintaining a homogeneous particle distribution within the slurry;

(d) withdrawing the homogeneous particle-containing slurry via the outlet;

(e) reducing the rotational speed $n_1$ of the at least one impeller to a reduced rotational speed $n_{red}$, whereas $n_{red}$ is lower than $n_1$ and higher or equal to $n_{min}$ according to equation (1):

$$n_{min} = \frac{Sv^{0.1} D_p^{0.2} \left(g \frac{\Delta \rho}{\rho_f}\right)^{0.45} B^{0.13}}{D_a^{0.85}}. \quad (1)$$

Definitions

The term splashing as used herein has to be understood as an uncontrolled process of distribution of parts of the slurry by the impeller, whereby the slurry is distributed onto the walls of the vessel. Splashing occurs predominantly if the impeller is close to the level of the slurry. Hence, the impeller rotates close to the phase boundary between the liquid carrier of the slurry and the gas phase, throwing parts of the slurry up in the gas phase and onto the walls of the vessel.

Sedimentation as used herein describes the tendency of particles in the slurry to settle out of the liquid and come to rest at the bottom of the vessel. The force causing this effect is the gravitational force, which drags the particles from all over the slurry to the bottom. Hence, if no other force is affected on the particles, they will settle within a certain time, called sedimentation time. Herein, the term sedimentation time is understood as the time needed to achieve sedimentation in an amount to lose the homogeneity of the slurry. The sedimentation time as used herein has to be understood as the time needed for a particle to travel a predefined distance that is determined based on the dimensions of the vessel, e.g. the height of the vessel, in vertical direction to the bottom of the vessel.

The term vessel as used herein describes a container having an inlet and an outlet, the outlet preferably being at the bottom of the vessel (in direction of the gravitational force). Furthermore, the vessel has a rotatable vertical axis, which proceeds vertically with respect of the direction of the gravitational force. At least one impeller is attached to this axis. The container can generally have any shape. A cylindrical shape with the vertical axis proceeding parallel to the cylindrical walls is preferred.

The term impeller as used herein has to be understood as a rotor, which influences the flow of the liquid in the vessel. Thereby the rotor generally can have any shape as long as at least a partial radial flow of the liquid is caused if the impeller is rotated. Impellers inducing also a partial axial flow of the liquid such as hydrofoil impellers are preferred herein.

The rotational speed of the impeller around the vertical axis of the vessel is understood as the number of turns of the impeller divided by time specified as revolutions per minute (rpm).

The reduced rotational speed of the impeller describes a rotational speed, where reduced or no splashing is observed by the impeller. Moreover, the minimum rotational speed of the impeller is the speed at which no sedimentation will occur, but splashing is still avoided.

The term level of the slurry denotes the phase boundary between the liquid of the slurry and the gas phase layer above the slurry in the vessel.

BRIEF DESCRIPTION OF THE DRAWINGS

FIG. 1 shows a schematic drawing of a vessel of the present invention.

FIG. 2 shows a diagram representing the implementation of the minimum rotational speed.

FIG. 3 shows a diagram representing the implementation of the minimum rotational speed in intervals around the impeller.

FIG. 4 shows a schematic drawing of a vessel of the present invention having a control algorithm for automated operation.

FIG. 5 is a graph illustrating an example of the control algorithm adjusting the trigger times for reducing the rotational speed of the impeller based on the data provided by the sensors to the control system.

DETAILED DESCRIPTION OF THE PRESENT INVENTION

The inventors have found a process for providing a homogeneous particle-containing slurry comprising the steps of:
(a) providing a vessel comprising at least one impeller rotating around a vertical axis of the vessel, wherein a rotational speed $n_1$ of the at least one impeller is higher than $n_{min}$ according to equation (1), the vessel further comprising an inlet and an outlet;
(b) introducing a particle-containing slurry into the vessel or introducing components forming the particle-containing slurry into the vessel;
(c) rotating the at least one impeller at least around the vertical axis for homogenizing and/or maintaining a homogeneous particle distribution within the slurry;
(d) withdrawing the homogeneous particle-containing slurry via the outlet;
(e) reducing the rotational speed $n_1$ of the at least one impeller to a reduced rotational speed $n_{red}$, whereas $n_{red}$ is lower than $n_1$ and higher or equal to $n_{min}$ according to equation (1):

$$n_{min} = \frac{S v^{0.1} D_p^{0.2} \left(g \frac{\Delta \rho}{\rho_f}\right)^{0.45} B^{0.13}}{D_a^{0.85}} \quad (1)$$

with
$n_{min}$=minimum rotational speed of the impeller,
S=shape factor of the impeller,
v=kinematic viscosity,
$D_p$=average particle size in the slurry,
g=gravitational constant,
$\Delta\rho$=difference between particle density $\rho_p$ and liquid density $\rho_f$ in the slurry $(\rho_p - \rho_f)$,
$\rho_f$=density of the liquid phase of the slurry,
B=100*solid weight/liquid weight,
$D_a$=diameter of the impeller.

A definition of the shape factor of the impeller S can be found in 'Comparing Impeller Performance for Solid-Suspension in the Transitional Flow Regime with Newtonian Fluids', Chem. Eng. Res. Des., Vol. 77(8), November 1999, pp. 721-727.

Preferably, the reducing is effected when the level of the slurry during withdrawal is close to the vertically upper end of the impeller until the lower end of the impeller with respect to the vertical axis is above the level of the slurry.

For simplicity reasons, the impeller could also just be stopped. However, giving the fact that pumping the slurry out of the vessel is generally taking place at slow rates, the time of stopping the impeller needed to let the level of the slurry pass is quite high. Hence, the possibility of sedimentation of the particles during stopping of the impeller is increased. This is in particular relevant, if there are exceptionally big particles that might be accidentally formed.

Furthermore, the minimum rotational speed that ensures that no sedimentation will take place can be determined using the Zwietering correlation (equation (1)), which is described e.g. in 'Unit Operations of Chemical Engineering', McCabe, W., Smith, J., Harriott, P., and Mcgraw-Hill, 1993. p. 265.

This invention discloses a process for operating a continuously stirred tank reactor, e.g. feeding vessels, resulting in minimum or even elimination of splashing of slurry on the wall of the vessel. This is achieved by the process as described above, in which the rotational speed of the impeller is reduced to a minimum value. Such a process has the advantage of ensuring minimum material accumulation on the wall and consequently avoiding blockage of the vessel outlet or failure of the process in general. Moreover, this process ensures that the quality of the slurry is not deteriorated because of particles segregation and sedimentation. In particular this process further suits operating strategies that require slurry withdrawal over an extended period of time.

It is particularly preferable to reduce the rotational speed of the impeller when the level of the slurry is close to the vertically upper end of the impeller with respect to the vertical axis of the impeller. This ensures that the reducing of the rotational speed of the impeller happens when the splashing would occur. Such a process additionally allows for improved homogenization at reduced splashing.

Even more preferably, in the process according to the present invention the reducing of the rotational speed of the impeller is effected when the level of the slurry during withdrawal is within a range from 0.5*$D_a$ (diameter of the impeller) above the vertically upper end of the impeller with respect to the vertical axis of the impeller. Furthermore, it is preferred that the reducing is stopped when the level of the slurry is 0.05*$D_a$ below the vertically lower end of the impeller with respect to the vertical axis of the impeller.

The process of the present invention generally works with vessels having any dimensions.

An impeller as comprised in the vessel according to the present invention preferably extends at least partially into the horizontal plane being orthogonal to said vertical axis and further extends at least partially into the direction of said vertical axis. Thereby an up- or down-pumping effect can be achieved depending on the orientation of the horizontal plane alongside the direction of the vertical axis. If the plane orientates alongside the direction of the vertical axis towards the upper part of the vessel, an up-pumping impeller is provided. On the other hand, if the plane orientates alongside the direction of the vertical axis towards the lower part of the vessel, a down-pumping impeller is provided. In the process according to the present invention, down-pumping impellers are preferred.

The vessel in the process according to the present invention can comprise only one impeller or preferably more than one impeller at different levels of height with respect to the vertical axis of the vessel.

If more than one impeller is comprised by the vessel, these impellers can be connected to the rotatable vertical axis in a way that all connected impellers have the same rotational speed. This might be achieved e.g. in that there is only one rotatable axis comprised in the vessel. In such an embodiment, all impellers will have reduced rotational speed if one impeller has reduced rotational speed to avoid splashing of the slurry.

In another even more preferred embodiment more than one impeller can be present in the vessel which all can be driven independently of each other by their own rotational speed. Each of their axes could be driven by separate engines allowing for individual rotational speeds of the impellers. In such an embodiment, only one impeller could have reduced rotational speed to avoid splashing of the slurry, while the other impellers still maintain their original rotational speed. Preferably, in such an embodiment, the reducing of the rotational speed of only one impeller is effected when the level of the slurry during withdrawal is within a range from 0.5*$D_a$ (diameter of the impeller) above the vertically upper end of said impeller to 0.05*$D_a$ below the vertically lower end of said impeller with respect to the vertical axis of said impeller.

In the process according to the present invention in step (e) the rotational speed of the impeller is reduced to the minimum rotational speed $n_{min}$ according to equation (1). This process is in particular useful for lower slurry withdrawal speeds. It ensures that the time for the slurry surface to pass the level of the impeller can be arbitrarily chosen. Hence, also embodiments with very slow slurry withdrawal can be processed. Furthermore, it might be the case in some embodiment that the slurry also rises again or stays at the level of the impeller for an unpredicted longer time. Also in these situations the second process ensures significantly reduced splashing occurrence.

EXAMPLES

Example 1

This example is implementing the minimum rotational speed $n_{min}$ without causing sedimentation of the particles in the vessel. The minimum rotational speed is estimated using the Zwietering correlation (equation (1)). In this case, the minimum rotational speed has been calculated for different particles diameters as shown in Table 1 below.

TABLE 1

Calculated minimum rotational speeds for different particle diameters for a shape factor S of 6.13, a kinematic viscosity v of 2.1 × $10^{-5}$ m²/s, a density of the liquid phase of the slurry $\rho_f$ of 907 kg/m³, a density of the particles of the slurry $\rho_p$ of 1300 kg/m³, a solid weight/liquid weight ratio B of 30%, and a diameter of the impeller $D_a$ of 0.5 m.

| $D_p$ [μm] | $n_{min}$ [rpm] |
|---|---|
| 70 | 62 |
| 80 | 63 |
| 90 | 65 |
| 100 | 65 |

Considering e.g. an average particle diameter in the slurry of 90 μm, the minimum rotational speed required to prevent sedimentation is 65 rpm. As shown in FIG. 2, in a first operational mode the respective minimum rotational speed can be adjusted at a time before the level of slurry reaches the upper level of the first impeller in vertical direction. This minimum rotational speed is maintained until the level of slurry has passed the lower level of the last impeller in vertical direction.

Such an operational mode is in particular advantageous if the observation of the level of slurry is difficult and/or generally the process should be run in a very simplistic manner.

FIG. 3 shows an operational mode, in which the reduction of rotational speed is reverted, if the level of slurry is in between two impellers. This Figure further shows the decrease of the level of the slurry inside the vessel during withdrawal of the feeding vessel at a slow rate. In such an operational mode the homogenization is further improved while withdrawing the slurry from the reactor.

Moreover, the risk of sedimentation is further reduced. Hence, this operational mode ensures both minimum sedimentation and minimum splashing when the level is close to the impellers.

The best operational mode is achieved if the rotational speed is reduced when the level of the slurry is 0.5*$D_a$ (diameter of the impeller) above the vertically upper end of the impeller and 0.05*$D_a$ below above the vertically lower end of the impeller. If the rotational speed is reduced at levels of the slurry of <0.5*$D_a$ above the vertically upper end of the impeller and/or again raised at levels of the slurry of <0.05 $D_a$ below above the vertically lower end of the impeller, splashing is not completely avoided. On the other hand, if the rotational speed is reduced at levels of the slurry of >0.5*$D_a$ above the vertically upper end of the impeller and/or again raised at levels of the slurry of >0.05 $D_a$ below above the vertically lower end of the impeller, the overall operation is significantly slowed down and it even might result in particles sedimentation.

Such an operation mode is especially advantageous in case of vessels having more than one impeller, all of which are connected to the vertical axis and, hence, cannot be driven with differing rotational speeds. In cases where each impeller can be driven at its own rotational speed it is also the best mode to achieve the reducing of the rotational speed for each impeller in said interval.

Example 2

Manual operation of the proposed methodology can have negative effects on the efficiency of the process. Such negative effects could arise e.g. from variation in withdrawal speed of the slurry or even unexpected stops of the withdrawal. In such cases, the reducing of the rotation speeds of the impeller must be adapted. Thus, it is preferred to apply a controlled process providing a homogeneous particle-containing slurry.

Such a controlled process is depicted in FIG. 4 including a control system comprising: (a) a level sensor, e.g. ultrasound level sensor; (b) an inferential control system to estimate the set point for the controller and (c) a controller, e.g. proportional-integral-derivative controller (PID), to regulate the rotational speed of the impeller.

From system properties such as average particles size, viscosity, density and stirrer design parameters the minimum rotational speed is determined using the Zwietering correlation (equation (1)) and sent to the controller as a set-point for motor rotational speed. During operation of the vessel, the level of the slurry inside the vessel is measured by the level sensor and also sent to the controller.

The controller automatically enables reduced rotational speed of the impeller, which is close to the level of the slurry, if the slurry passes a certain predetermined trigger point monitored by the level sensor. Hence, at normal operation, the process follows a pre-defined pattern as that depicted in FIG. 3.

However, if a disturbance affects the process, the control algorithm adjusts the trigger times of the reducing of the rotational speed of the impeller based on the data provided by the sensors to the control system. In FIG. 5 a case is depicted, where a sudden stop of withdrawal of the slurry happens (between 45 and 60 min). The control system reacts and shifts the reduction of the impeller rotational speed by the time delay needed to re-establish the normal withdrawal rate.

Most of e.g. preparations of polymerization catalysts are long-time processes. Hence, running these processes manually would be cost intensive and prone to errors. Automating the variation of rotational speed modification is vital to ensure efficient operation over a long time. Moreover, automation can further be advantageously used to gather information about the operability of the system.

Such information could be used to further optimize the process.

The invention claimed is:

1. Process for providing a homogeneous particle-containing slurry comprising the steps of:
    (a) providing a vessel comprising at least one impeller rotating around a vertical axis of the vessel, wherein a rotational speed $n_1$ of the at least one impeller is higher than $n_{min}$ according to equation (1), the vessel further comprising an inlet and an outlet;
    (b) introducing a particle-containing slurry into the vessel or introducing components forming the particle-containing slurry into the vessel;
    (c) rotating the at least one impeller at least around the vertical axis for homogenizing and/or maintaining a homogeneous particle distribution within the slurry;
    (d) withdrawing the homogeneous particle-containing slurry via the outlet;
    (e) reducing the rotational speed $n_1$ of the at least one impeller to a reduced rotational speed $n_{red}$, whereas $n_{red}$ is lower than $n_1$ and higher or equal to $n_{min}$ according to equation (1):

$$n_{min} = \frac{S v^{0.1} D_p^{0.2} \left(g \frac{\Delta \rho}{\rho_f}\right)^{0.45} B^{0.13}}{D_a^{0.85}} \quad (1)$$

with
$n_{min}$=minimum rotational speed of the impeller,
S=shape factor of the impeller,
v=kinematic viscosity,
$D_p$=average particle size in the slurry,
g=gravitational constant,
$\Delta \rho$=difference between particle density $\rho_p$ and liquid density $\rho_f$ in the slurry ($\rho_p$-$\rho_f$),
$\rho_f$=density of the liquid phase of the slurry,
B=100*solid weight/liquid weight,
$D_a$=diameter of the impeller.

2. The process according to claim 1, wherein in step e) $n_{red}$ is $n_{min}$.

3. Process according to claim 1, wherein the at least one impeller has a vertically upper end with respect to the vertical axis of the at least one impeller and a vertically lower end with respect to the vertical axis of the vessel and
    wherein the reducing of the rotational speed of the impeller is effected when the level of the slurry during withdrawal is within a range from 0.5*$D_a$ to 0.1*$D_a$ above the vertically upper end of the at least one impeller and is continued until the level of the slurry is within a range from 0.1*$D_a$ to 0.05*$D_a$ below the vertically lower end of the at least one impeller.

4. Process according to claim 1, wherein the vessel comprises more than one impeller at different height levels with respect to the vertical axis of the vessel and wherein the rotational speed $n_1$ of one or more of said impellers is reduced according to step (e).

5. Process according to claim 1, wherein the rotational speed of each impeller can be reduced independently from the remaining impellers.

6. Process according to claim 1, wherein the at least one impeller extends at least partially into the horizontal plane being orthogonal to said vertical axis and further extends at least partially into the direction of said vertical axis.

7. Process according to claim 1, wherein the process is automatically controlled.

8. Process according to claim 7, wherein the process comprises a control system comprising a controller, a level sensor and an inferential control system.

* * * * *